United States Patent
Chi et al.

(10) Patent No.: US 7,301,996 B1
(45) Date of Patent: Nov. 27, 2007

(54) SKEW CANCELLATION FOR SOURCE SYNCHRONOUS CLOCK AND DATA SIGNALS

(75) Inventors: Kuang-Kai Chi, San Jose, CA (US); Ju-Young Lee, San Jose, CA (US); Zhi-Min Qi, Cupertino, CA (US); Dah-Shi Shen, Milipitas, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 804 days.

(21) Appl. No.: 10/447,120

(22) Filed: May 28, 2003

(51) Int. Cl.
*H04B 3/46* (2006.01)

(52) U.S. Cl. ............... 375/226; 375/355; 375/371; 327/161

(58) Field of Classification Search ............... 375/224, 375/226, 316, 371, 354, 355, 375, 376; 327/149, 327/152, 158, 159, 161, 162; 370/503, 516, 370/517, 518
See application file for complete search history.

(56) References Cited

U.S. PATENT DOCUMENTS

| | | | |
|---|---|---|---|
| 6,031,428 A | 2/2000 | Hill | 331/11 |
| 6,650,575 B1 * | 11/2003 | Khanna | 365/194 |
| 7,031,420 B1 * | 4/2006 | Jenkins et al. | 375/371 |
| 2001/0033188 A1 * | 10/2001 | Aung et al. | 327/141 |
| 2002/0190751 A1 * | 12/2002 | Lee et al. | 326/39 |

OTHER PUBLICATIONS

Jason Konstas., *Converting Wide, Parallel Data Buses to High Speed Serial Links*, International IC Conference Proceedings, 1999, pp. 19-30.
National Semiconductor Corporation Data Sheet, *48-Bit LVDS Channel Link Serializer/Deserializer*, Jul. 2000, pp. 1-17.

* cited by examiner

*Primary Examiner*—Chieh M. Fan
*Assistant Examiner*—Jason Joseph

(57) ABSTRACT

The skew between a received clock signal and a received data signal that are source synchronous, is accounted for such that stable bit values of the received data signal may be sampled. For programmable skew cancellation, a skew value corresponding to the amount of the skew is determined and programmed into a data storage device. Sampling clock signals of the same frequency but different phases are generated from the clock signal, and one of the sampling clock signals having the desired phase is selected depending on the programmed skew value. Alternatively, for automatic skew cancellation, a phase locked loop compares the received data signal to one of the sampling clock signals to determine the skew value for selecting the sampling clock signal having the desired phase. Stable bit values of the data signal are then sampled with the selected sampling clock signal.

17 Claims, 14 Drawing Sheets

SKEW CANCELLATION FOR SOURCE SYNCHRONOUS CLOCK AND DATA SIGNALS

TECHNICAL FIELD

This invention relates generally to source synchronous data communications, and more particularly, to a method and system for canceling/calibrating for skew between clock and data signals that are source synchronous.

BACKGROUND

FIG. 1 shows a conventional source synchronous communications system 100 for data communications between a first low speed data processor 102 and a second low speed data processor 104. A plurality of high speed data channels including a first high speed data channel 106, a second high speed data channel 108, and so on, up to an Nth high speed data channel 110, are coupled between a source synchronous transmitter 112 and a source synchronous receiver 114.

The data processors 102 and 104 are "low speed" in that they generate V-bits of parallel data bits at a frequency that is V-times lower than the frequency of serial data transmission through the "high speed" data channels 106, 108, and 110. The source synchronous transmitter 112 serializes the parallel V-bits for serial data transmission through the data channels 106, 108, and 110. Thus, the source synchronous transmitter 112 is comprised of a respective transmitter serializer for each of the high speed data channels 106, 108, and 110.

A first transmitter serializer 116 receives a first parallel V-bits from the first low speed data processor 102 and serializes such V-bits to generate serial data bits SDOUT1 transmitted via the first high speed data channel 106. Similarly, a second transmitter serializer 118 receives a second parallel V-bits from the first low speed data processor 102 and serializes such V-bits to generate serial data bits SDOUT2 transmitted via the second high speed data channel 108. In addition, an Nth transmitter serializer 120 receives an Nth parallel V-bits from the first low speed data processor 102 and serializes such V-bits to generate serial data bits SDOUTN transmitted via the Nth high speed data channel 110.

A transmitter PLL (phase locked loop) 122 receives a transmit clock signal, from the first low speed data processor 102, that is synchronized with each of the V-bits generated for the transmitter serializers 116, 118, and 120. For example, each of the V-bits is generated for the transmitter serializers 116, 118, and 120 for every clock cycle of the transmit clock signal from the first low speed data processor 102. The transmitter PLL 122 generates a high speed transmit clock signal (HSTCLK) with a frequency that is V-times the frequency of the transmit clock signal from the first low speed data processor 102.

Each of the transmitter serializers 116, 118, and 120 uses HSTCLK from the transmitter PLL 122 to generate the serial data bits SDOUT1, SDOUT2, and SDOUTN from the respective parallel V-bits. In addition, each of the high speed data channels 106, 108, and 110 transmits the serial data bits SDOUT1, SDOUT2, and SDOUTN at the higher frequency of HSTCLK.

The transmitter PLL 122 also generates a transmitted clock signal (CLKOUT) that is transmitted via a clock data channel 124. CLKOUT has the lower frequency of the transmit clock signal from the data processor 102 and is synchronized with the serial data bits SDOUT1, SDOUT2, and SDOUTN. For example, V-bits of the serial data bits SDOUT1, SDOUT2, and SDOUTN may be generated every cycle of CLKOUT. Thus, the transmitted data bits SDOUT1, SDOUT2, and SDOUTN and the transmitted clock signal CLKOUT are termed "source synchronous". In addition, the high speed data channels 106, 108, and 110 and the synchronized clock signal CLKOUT comprise a "source synchronous link group".

A plurality of receiver deserializers comprise the source synchronous receiver 114 including a first receiver deserializer 126, a second receiver deserializer 128, and so on, up to an Nth receiver deserializer 130. In addition, a receiver PLL (phase locked loop) 132 receives a received clock signal CLKIN which is the transmitted clock signal CLKOUT transmitted via the clock data channel 124. The receiver PLL 132 generates a high frequency sampling clock signal SCLK to be used by each of the receiver deserializers 126, 128, and 130 for sampling a respective received data signal. The frequency of SCLK is V-times the frequency of the received clock signal CLKIN.

Received serial bits data signals SDIN1, SDIN2, and SDINN are the transmitted serial data bits SDOUT1, SDOUT2, and SDOUTN, respectively, transmitted via the high speed data channels 106, 108, and 110, respectively. The first receiver deserializer 126 samples the first received serial bits data signal SDIN1 using SCLK to generate a parallel V-bits data signal for the second low speed data processor 104. Similarly, the second receiver deserializer 128 samples the second received serial bits data signal SDIN2 using SCLK to generate a parallel V-bits data signal for the second low speed data processor 104. In addition, the third receiver deserializer 130 samples the Nth received serial bits data signal SDINN using SCLK to generate a parallel V-bits data signal for the second low speed data processor 104.

The receiver PLL 132 also generates a parallel data clock signal that is the low speed received clock signal CLKIN delayed by a predetermined time period. The parallel data clock signal is synchronized with the parallel V-bits generated by the receiver deserializers 126, 128, and 130 and is used by the second low speed data processor 104 for processing such parallel V-bits from the receiver deserializers 126, 128, and 130.

FIG. 2 shows the components within the transmitter PLL 122 and within one of the transmitter serializers 116, 118, or 120, such as the Nth transmitter serializer 120 for example. The transmitter serializer 120 is comprised of a parallel to serial shift register 134, and the transmitter PLL 122 is comprised of a xV frequency multiplier 136 and a 1/V frequency divider 138. FIG. 3 shows a timing diagram during operation of the transmitter serializer 120 and the transmitter PLL 122 of FIG. 2.

Referring to FIGS. 2 and 3, a symbol comprised of the parallel V-bits, TD<1:V>140 in FIG. 3 and the low frequency transmit clock signal 142 are generated by the first low speed data processor 102. The shift register 134 uses an edge of the transmit clock signal 142 for loading in the symbol of the parallel V-bits. For example, an Nth symbol of the parallel V-bits 140 is loaded into the shift register at a rising edge 144 of a cycle 152 of the transmit clock signal 142.

The xV frequency multiplier 136 generates HSTCLK 146 in FIG. 3 by multiplying the frequency of the transmit clock signal 142 by V-times. In addition, the 1/V frequency divider generates CLKOUT 148 in FIG. 3 by dividing the frequency of HSTCLK 146 by V-times. Thus, the frequency of CLK-OUT 148 is substantially same as the frequency of the transmit clock signal 142.

In addition, the shift register 134 uses HSTCLK 146 to shift out the bits within the shift register 134 as the serial data bits SDOUT 150. For example, referring to FIGS. 2 and 3, each serial bit of SDOUT 150 is shifted out at each rising edge of HSTCLK 146. The symbol of V-bits shifted out as serial data bits is synchronized to an edge of the transmit clock signal 142 and thus of CLKOUT 148. For example in FIG. 3, the Nth symbol of V-bits is generated as the serial data bits SDOUT 150 after two cycles of HSTCLK 146 (i.e., with two bits of delay) after the rising edge 144 of the transmit clock 142 or of CLKOUT 148. Such a delay is typically to account for the sample and hold time during loading of the Nth symbol of V-bits into the shift register 134 at the rising edge 144. Nevertheless, the serial data output signal SDOUT 150 is synchronized with the transmitted clock signal CLKOUT 148.

Such a parallel to serial shift register 134, xV frequency multiplier 136, and 1/V frequency divider 138 are each individually known to one of ordinary skill in the art of electronics. In addition, each of the transmitter serializers 116, 118, and 120 has a respective parallel to serial shift register similar to the shift register 134 of FIG. 2 that each uses the one HSTCLK from the transmitter PLL 122 for generating the respective serial data bits SDOUT1, SDOUT2, and SDOUTN.

FIG. 4 shows the components within the receiver PLL 132 and within one of the receiver deserializers 126, 128, and 130 such as the Nth receiver deserializer 130 for example. The receiver deserializer 130 is comprised of a serial to parallel shift register 162, and the receiver PLL 132 is comprised of a xV frequency multiplier 164 and a re-timer 166. FIG. 5 shows a timing diagram during operation of the receiver deserializer 130 and the receiver PLL 132 of FIG. 4.

Referring to FIGS. 4 and 5, the xV frequency multiplier 164 generates SCLK 174 by multiplying the frequency of CLKIN 172 by V-times. In addition, the shift register 162 uses SCLK 174 to sample in and shift SDIN 176 at every rising edge of SCLK 174. The re-timer 166 generates the parallel data clock signal 178 by delaying CLKIN 172 a predetermined time period using SCLK 174.

The shift register 162 also uses the parallel data clock signal 178 for shifting out a symbol of parallel V-bits RD<1:V>180, at every rising edge of the parallel data clock signal 178. The re-timer 166 determines the timing of the rising edge of the parallel data clock signal 178 to ensure that the V-bits of a symbol are stabilized within the shift register 162 before being shifted out to the second low speed data processor 104. For example, a symbol of V-bits as sampled by the shift register 162 is two-bits delayed from a rising edge of CLKIN, and the re-timer is designed for such a known delay. At any rate, the received serial bits data signal SDIN 176 and the received clock signal CLKIN 172 are synchronized such that CLKIN 172 is used for defining the symbol boundaries of the V-bits.

Such a serial to parallel shift register 162, xV frequency multiplier 164, and re-timer 166 are each individually known to one of ordinary skill in the art of electronics. In addition, each of the receiver deserializers 126, 128, and 130 has a respective serial to parallel shift register similar to the shift register 162 of FIG. 4 that each uses the one SCLK from the receiver PLL 132 for sampling the respective received serial bits data signal SDIN1, SDIN2, or SDINN.

Referring to FIGS. 1, 5, and 6, the received clock signal CLKIN 172 and the received serial bits data signal SDIN 176 are transmitted via different data channels. Each of such different data paths is likely to have different delays such that CLKIN 172 and SDIN 176 are skewed. Referring to FIGS. 5 and 6, SCLK 174 is generated from CLKIN 172 with a rising edge of CLKIN 172 being aligned to a falling edge of SCLK 174. In that case, each rising edge of SCLK 174 is used for sampling SDIN 176.

FIG. 6 illustrates an ideal SDIN 182 that is not skewed with respect to the received clock signal CLKIN 172. The ideal SDIN 182 has a stable bit time 184 during which the bit value does not change within a total bit time 186. On the other hand, the value of SDIN 182 jitters within the bit time 186 out-side of the stable bit time 184 (as indicated by the cross-hatching in FIG. 6) and may change in bit-value with such jitter. The stable bit time 184 is typically about 50% of the total bit time 186.

For the ideal SDIN 182, the rising edge of SCLK 174 occurs substantially at the center of the stable bit time 184 such that a valid bit value is sampled. FIG. 6 also illustrates a skewed SDIN 188 that is skewed from CLKIN 172 by a skew time period 190. With such a skewed SDIN 188, the rising edge of SCLK 174 occurs during jitter of the skewed SDIN 188 such that the sampled bit value may not be valid.

Nevertheless, referring to FIG. 1, since the received clock signal CLKIN and the received serial bits data signal SDIN are transmitted via different data channels, such skew between such signals is likely to occur. For example, assume that SDIN is transmitted at 1 Gbps (giga-bits per second) such that each bit time is 1000 ps (pico-seconds) and such that the stable bit time 184 is 500 ps. In addition, assume that the serial to parallel shift register 162 requires a set-up and hold time of 100 ps for sampling the bit value. In that case, a skew of +/−200 ps may be tolerated by the source synchronous receiver 114 of the prior art. However, each of the data channels 106, 108, 110, and 124, which are typically comprised of PC board traces, connectors, termination resistors, and/or cables, may contribute more than the tolerated skew such as even a skew of over 30 ns (nano-seconds).

Thus, a mechanism is desired for accounting for the skew between the received clock signal CLKIN and the received serial bits data signal SDIN for sampling valid data bits of SDIN.

SUMMARY

Accordingly, in a general aspect of the present invention, the skew between a received clock signal and a received data signal that are source synchronous, is accounted for such that stable bit values of the received data signal may be sampled.

In one example embodiment, programmable skew cancellation is performed when the amount of the skew is less than a predetermined percentage of the bit time of the received data signal. In such programmable skew cancellation, a skew value corresponding to the amount of the skew is programmed into a data storage device. A sampling clock signal is generated from the received clock signal, and the phase of the sampling clock signal is selected depending on the programmed skew value. The received data signal is then sampled with this sampling clock signal.

In another embodiment of the present invention, automatic skew calibration is performed when the amount of the skew is equal to or greater than the predetermined percentage of the bit time of the received data signal. In such automatic skew calibration, a source synchronous transmitter serializer transmits a sync pattern of data bits during a training time period for the received data signal. A clock recovery phase locked loop uses such a sync pattern of the received data signal to determine a phase of the sampling clock signal that is used for sampling the received data signal.

In addition, skew cancellation or calibration is performed within a respective receiver deserializer for each of a plurality of data channels for canceling a respective skew with respect to the received clock signal of a corresponding received data signal transmitted via each of the plurality of data channels. Because each of the receiver deserializers accounts for such respective skew, the skew tolerance through each of the plurality of data channels is loosened for easier design of the data channels.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, 5, 6, 7, 8, 9, 10, 11, 12, 13, 14, 15, and 16 refer to elements having similar structure and function.

DETAILED DESCRIPTION

Figure 7:
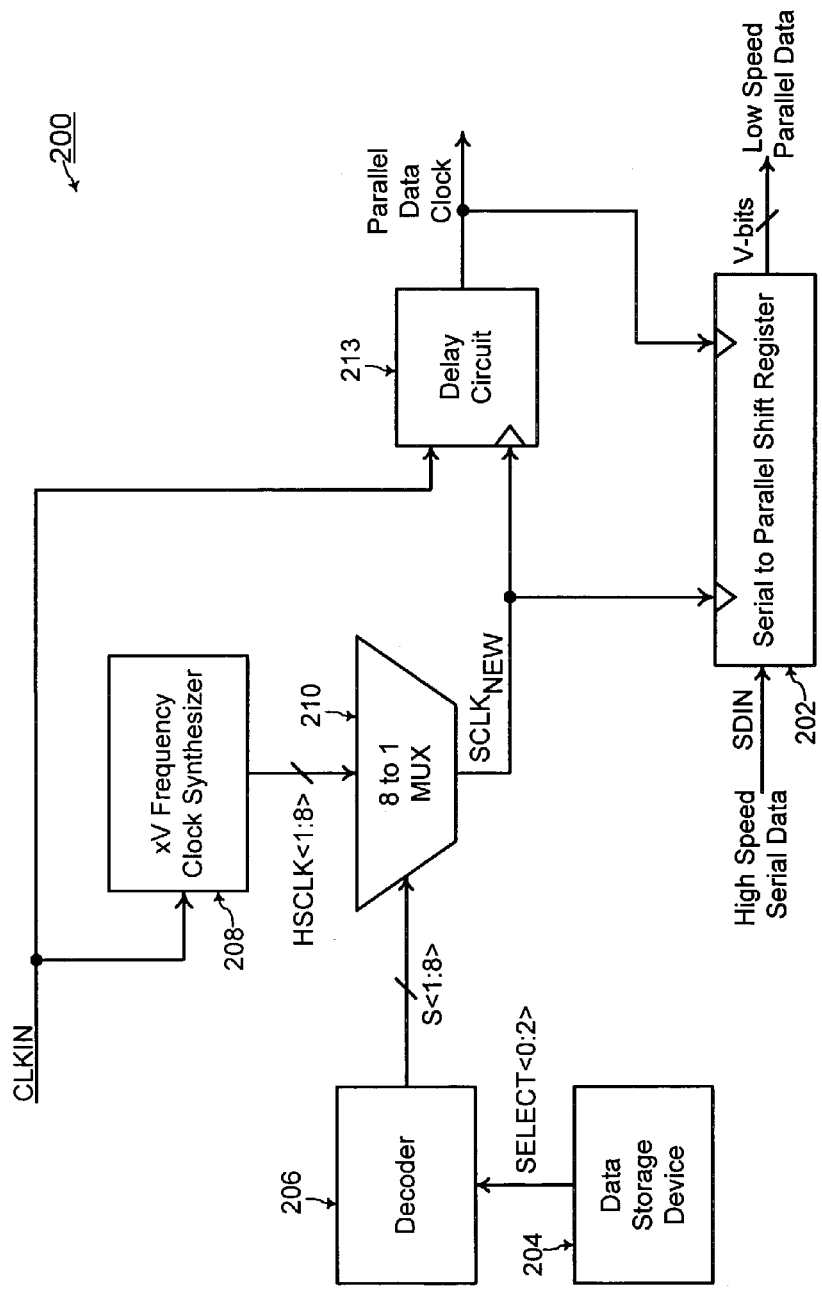
FIG. 7 shows a block diagram of a source synchronous receiver deserializer for programmable skew cancellation, according to an embodiment of the present invention.

Referring to FIG. 7, a source synchronous receiver deserializer 200 according to an aspect of the present invention includes a serial to parallel shift register 202 for inputting a received serial bits data signal SDIN. In addition, the receiver deserializer 200 also includes components for generating a sampling clock signal $SCLK_{NEW}$ and a parallel data clock signal from a received clock signal CLKIN.

For generating the sampling clock signal $SCLK_{NEW}$, a data storage device 204 stores three data bits SELECT<0:2> programmed into the data storage device 204. A decoder 206 decodes the three data bits SELECT<0:2> to generate multiplexer control signals S<1:8>. A clock circuit, such as a xV frequency clock synthesizer 208, inputs CLKIN and generates a plurality of high speed sampling clock signals HSCLK<1:8>, 222, 224, 226, 228, 230, 232, 234, and 236 illustrated in the timing diagram of FIG. 8 for example.

A multiplexer 210 receives HSCLK<1:8> from the clock synthesizer 208 and selects one of them as $SCLK_{NEW}$, depending on the control signals S<1:8> from the decoder 206. For example, referring to FIG. 8, each of the eight sampling clock signals HSCLK<1:8> are successively phase shifted from each other by 45°. Given SDIN 238 in FIG. 8, the sixth $HSCLK_6$ 232 is desired as $SCLK_{NEW}$ 242 having the rising edges centered about a stable bit time 240 of each cycle of SDIN 238.

Figure 4:
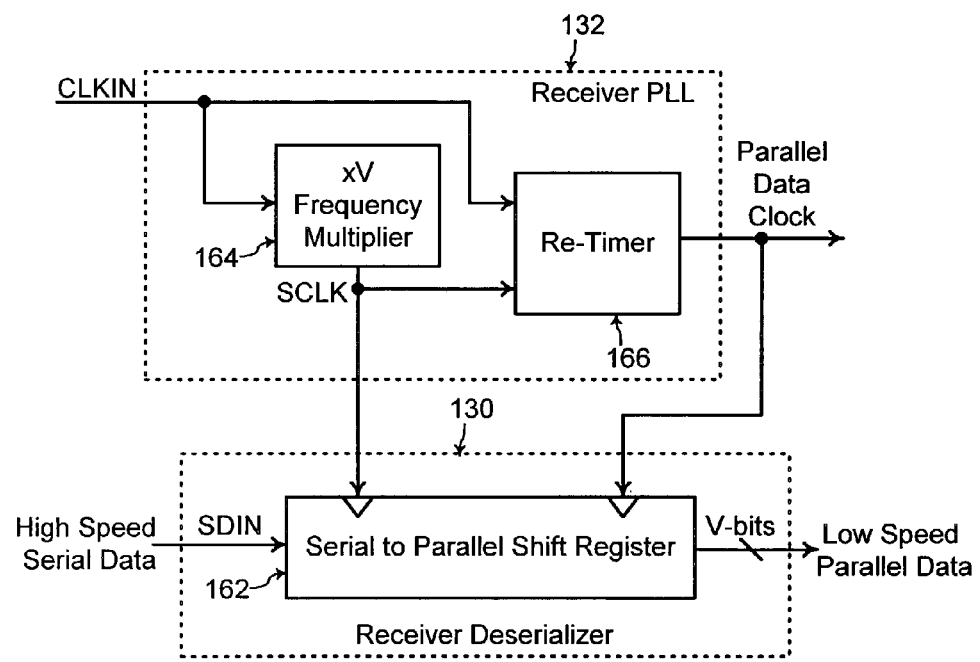
FIG. 4 shows a block diagram of a receiver deserializer and a receiver phase locked loop of the source synchronous communications system of FIG. 1, according to the prior art.
Figure 3:
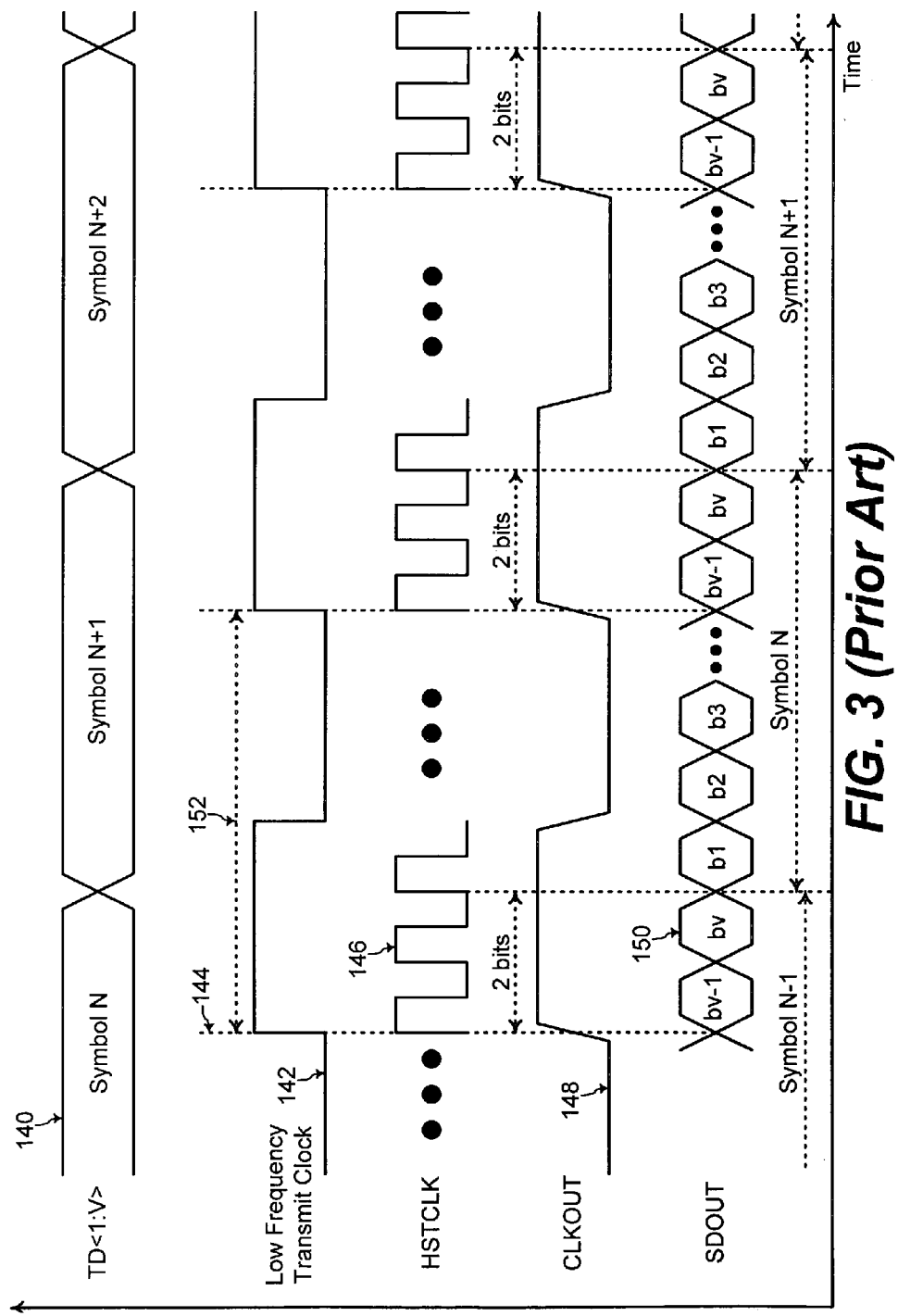
FIG. 3 shows a timing diagram during operation of the transmitter serializer and the transmitter phase locked loop of FIG. 2, according to the prior art.
Figure 5:
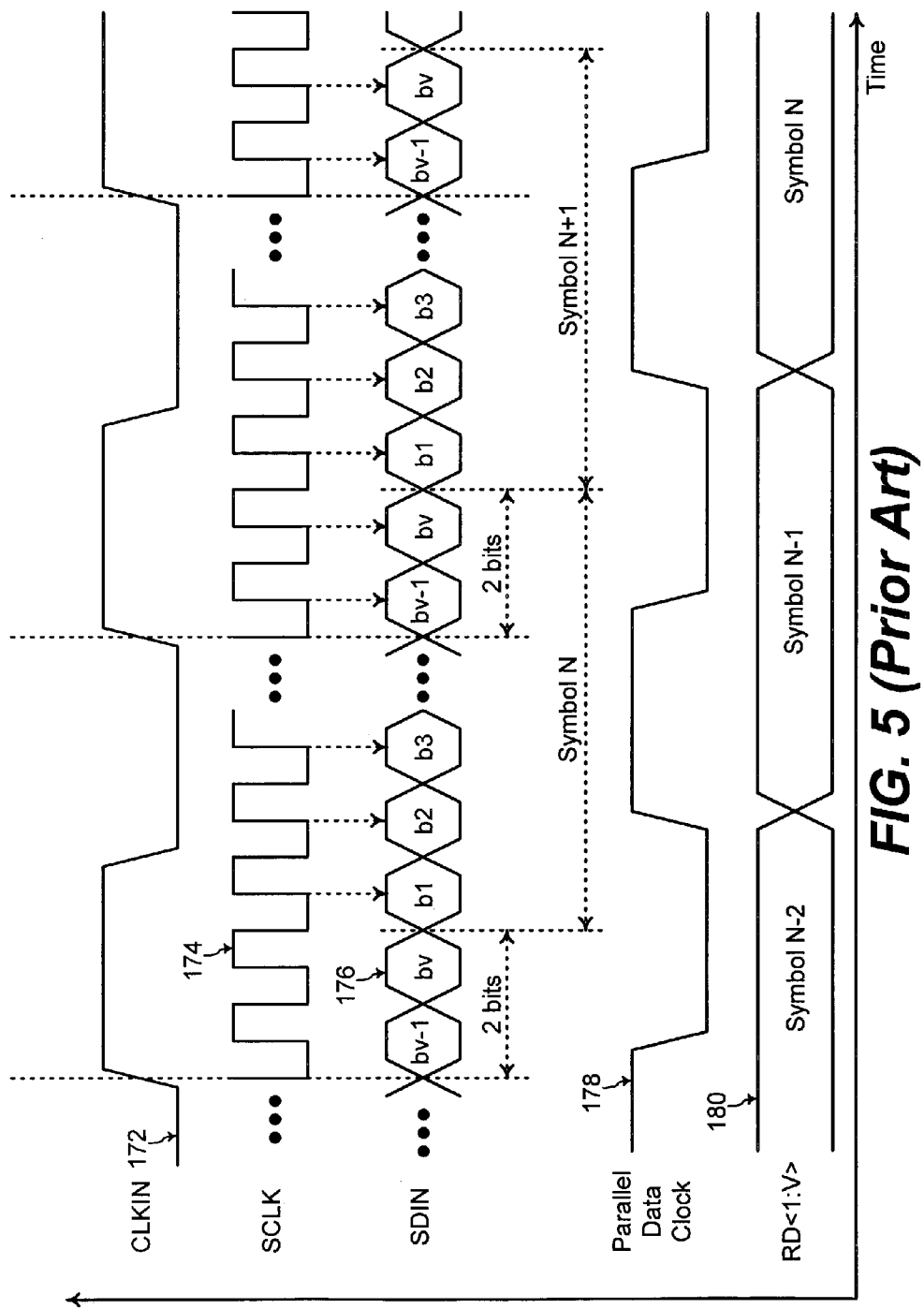
FIG. 5 shows a timing diagram during operation of the receiver deserializer and the receiver phase locked loop of FIG. 4, according to the prior art.
Figure 8:
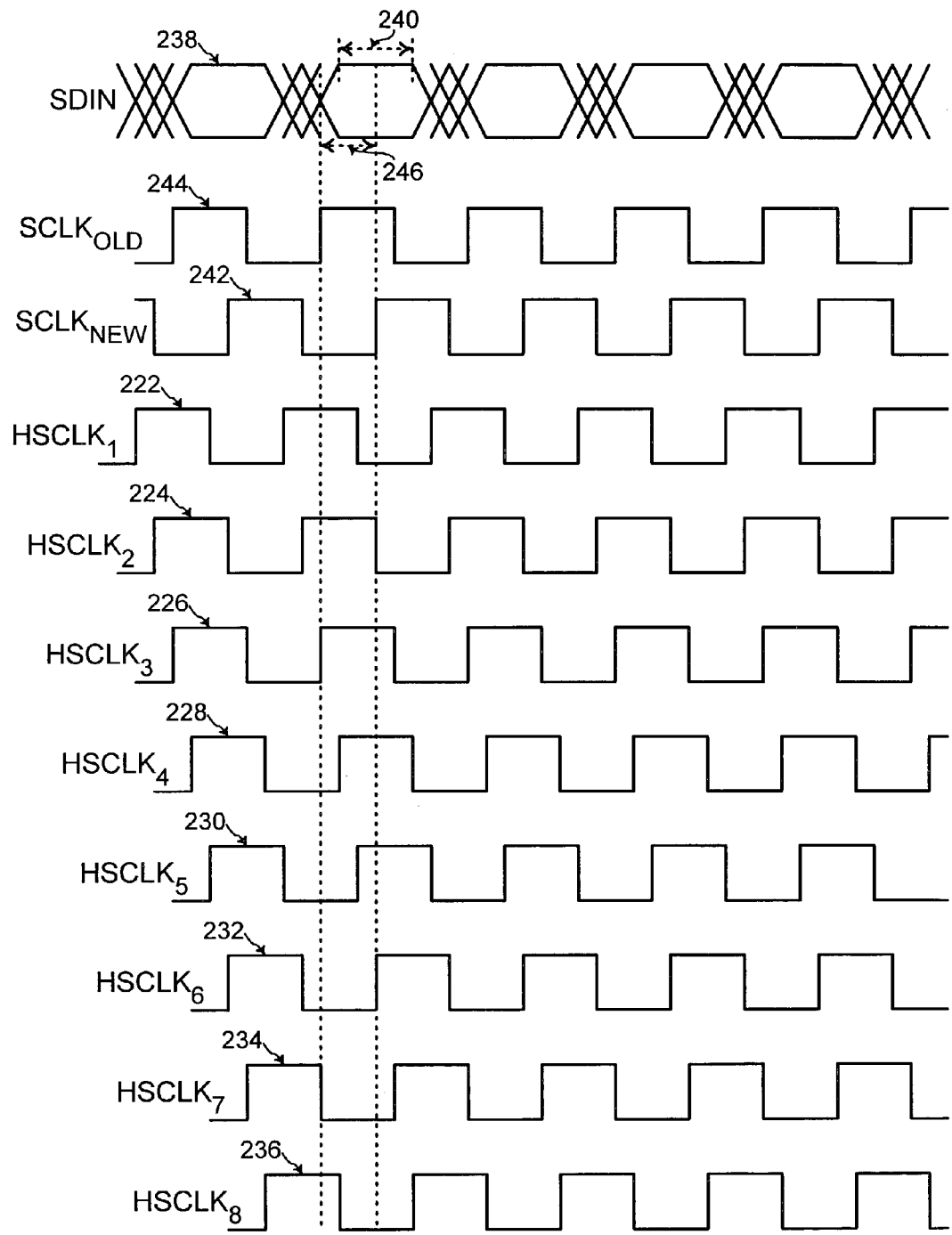
FIG. 8 shows a timing diagram for selecting a phase of SCLK during operation of the receiver deserializer of FIG. 7, according to an embodiment of the present invention.

$SCLK_{OLD}$ 244 in FIG. 8 is the SCLK signal generated by the xV frequency multiplier 164 of FIG. 4 from the received clock signal CLKIN. It is shown for comparison to $SCLK_{NEW}$. Because of the skew between CLKIN and SDIN 238, the rising edges of $SCLK_{OLD}$ 244 occur during jitter of SDIN 238 outside of the stable bit time 240. Thus, data bits sampled by $SCLK_{OLD}$ 244 would not be valid. The phase shift 246 between $SCLK_{OLD}$ 244 and $SCLK_{NEW}$ 242 indicates the amount of skew between CLKIN and SDIN 238.

Figure 9:
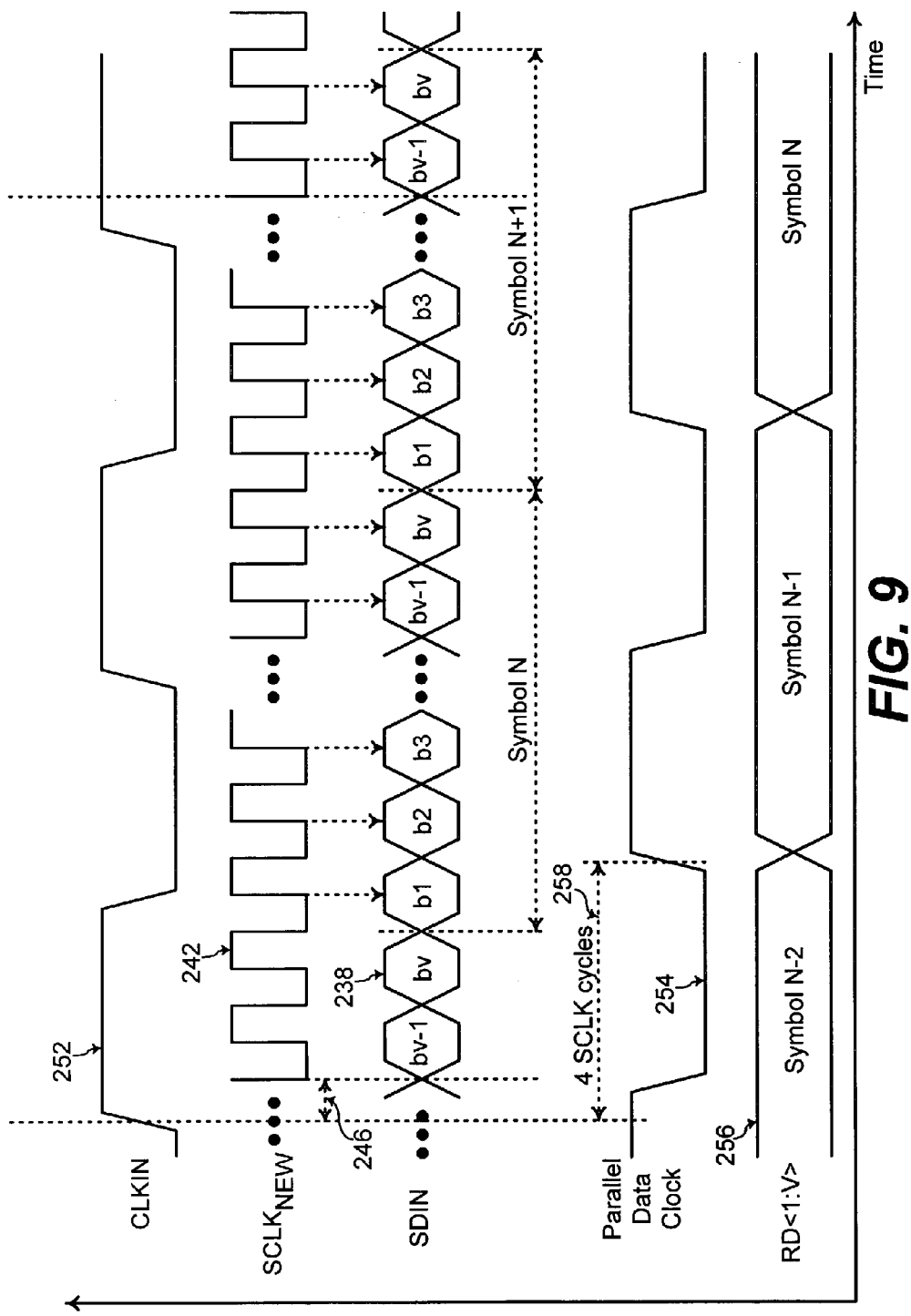
FIG. 9 shows a timing diagram during operation of the receiver deserializer of FIG. 7 with programmable skew cancellation, according to an embodiment of the present invention.

FIG. 9 shows the timing diagram during operation of the receiver deserializer 200 of FIG. 7. Referring to FIGS. 7, 8, and 9, $SCLK_{NEW}$ 242 is generated from the multiplexer 210 as the sixth $HSCLK_6$ 232. Thus, the falling edge of $SCLK_{NEW}$ 242 is phase shifted from the rising edge of the CLKIN 252 by the skew time period 246 in FIGS. 8 and 9. The rising edges of $SCLK_{NEW}$ 242 are used for sampling SDIN 238 (shown in FIG. 9 without the jitter regions for clarity of illustration).

Referring to FIGS. 7 and 9, the source synchronous receiver deserializer 200 includes a delay circuit 213 for generating the parallel data clock signal 254 from CLKIN 252 and $SCLK_{NEW}$ 242. In one embodiment of the present invention, the parallel data clock signal 254 is CLKIN 252 delayed by a predetermined number of cycles 258 of $SCLK_{NEW}$ 242. An edge of the parallel data clock signal 254, such as the rising edge in FIG. 9, is used by the serial to parallel shift register 202 to shift out a symbol of V-bits RD<1:V>256 to the second low speed data processor 104. Such a delay 258 between CLKIN 252 and the parallel data clock signal 254 ensures that the V-bits of a symbol are stabilized within the serial to parallel shift register 202 before being shifted out to the second low speed data processor 104.

In this manner, for programmable skew cancellation, the amount of skew 246 between CLKIN 252 and SDIN 238 is first determined. Mechanisms for determining such an amount of skew 246 are known to one of ordinary skill in the art of source synchronous data communication. For example, during calibration of a source synchronous communications system 600 of FIG. 15 using the receiver deserializer 200, the amount of skew 246 between CLKIN 252 and SDIN 238 is determined using signal measuring equipment such as an oscilloscope coupled at the inputs to a source synchronous receiver 602.

Then, the three bits SELECT<0:2> are programmed into the data storage device 204 to indicate such an amount of the skew 246. The data storage device 204 may be part of a PLD (programmable logic device) that is programmed to store the amount of the skew 246 during calibration of the source synchronous communications system 600 of FIG. 15 using the receiver deserializer 200. The programmed three bits SELECT<0:2> determine the phase of $SCLK_{NEW}$ 242 from the multiplexer 210 such that the rising edges of $SCLK_{NEW}$ 242 occur within the stable bit time period of SDIN 238.

In one embodiment of the present invention, the programmed three bits SELECT<0:2> determine which of HSCLK<1:8> 222, 224, 226, 228, 230, 232, 234, and 236 of FIG. 8 is selected as $SCLK_{NEW}$ 242. However, more bits indicating the amount of the skew 246 may be programmed for selecting from more numerous high speed clock signals generated by the clock synthesizer 208. Mechanisms for programming the bits SELECT<0:2> into the data storage device 204 are known to one of ordinary skill in the art of electronics. In addition, implementation of each of the components 202, 204, 206, 208, 210, and 213, individually, is known to one of ordinary skill in the art of electronics.

Figure 6:
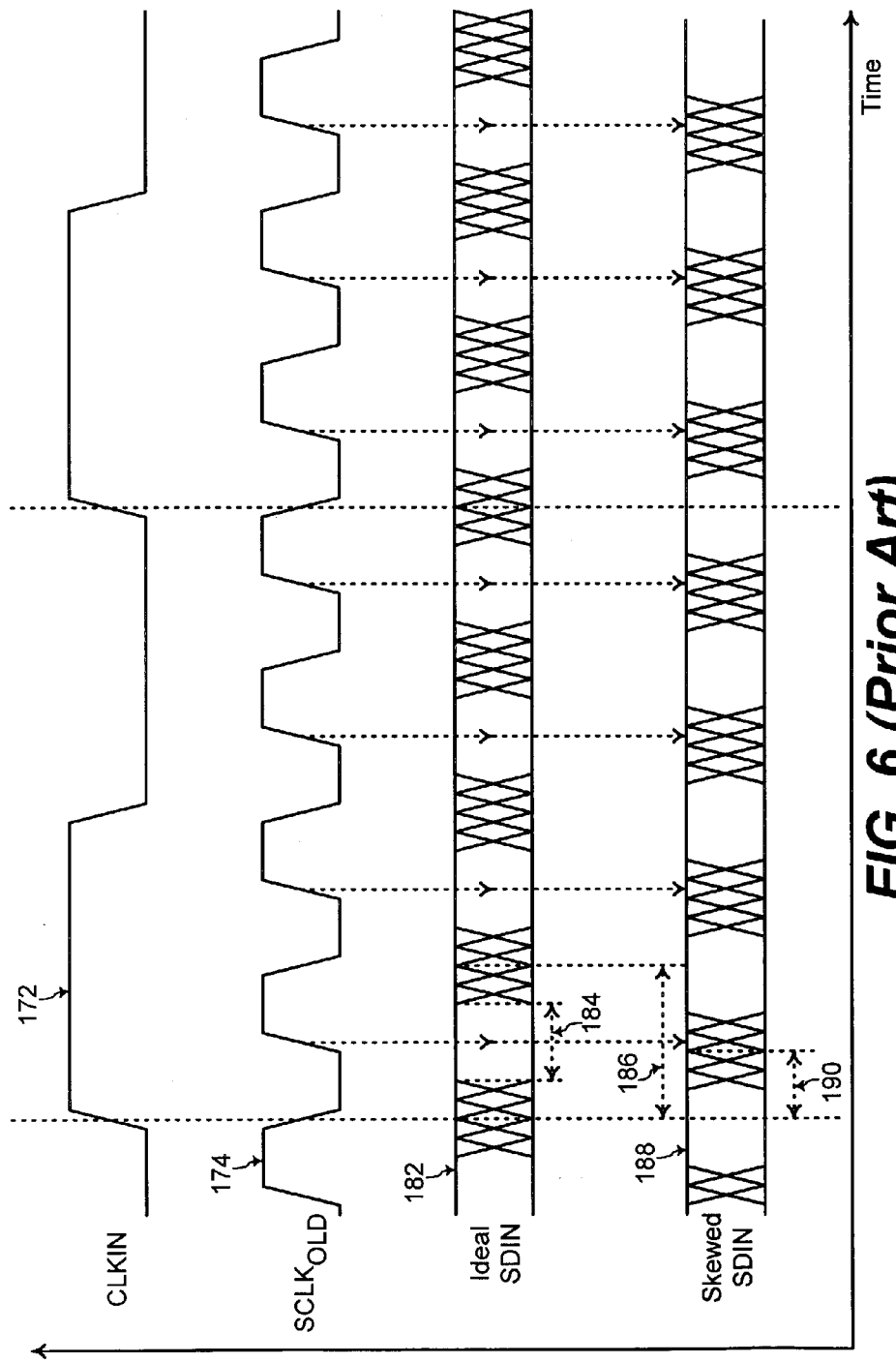
FIG. 6 shows a timing diagram with an ideal SDIN having no skew and with a skewed SDIN, according to the prior art.

Referring to FIGS. 6 and 7, the programmable skew cancellation with the source synchronous receiver deserializer 200 of FIG. 7 is useful when the amount of the skew 190 is less than a predetermined percentage of the total bit time 186. For example, assume that the stable bit time 184 is 50% of the total bit time 186, and that the serial to parallel shift register 202 requires 10% of the total bit time for sample and hold during sampling a bit value of SDIN. In that case, the programmable skew cancellation with the source synchronous receiver deserializer 200 of FIG. 7 is useful when the amount of the skew 190 is less than +/−40% (which is 50% minus X % that is the sample and hold time percentage for the shift register 202) of the total bit time 186.

A positive skew percentage means the rising edges of $SCLK_{OLD}$ 174 lead the centers of the stable bit time periods 184 by that percentage of the total bit time 186, and a negative skew percentage means the rising edges of the $SCLK_{OLD}$ 174 lag the centers of the stable bit time periods 184 by that percentage of the total bit time 186. Referring to FIG. 8, one of the plurality of sampling clock signals HSCLK<1:8>, 222, 224, 226, 228, 230, 232, 234, and 236 can cancel the skew between CLKIN and SDIN when the amount of the skew 246 is less than the predetermined percentage (which is 50% minus the sample and hold time percentage of the shift register 202) of the total bit time 186.

Figure 10:
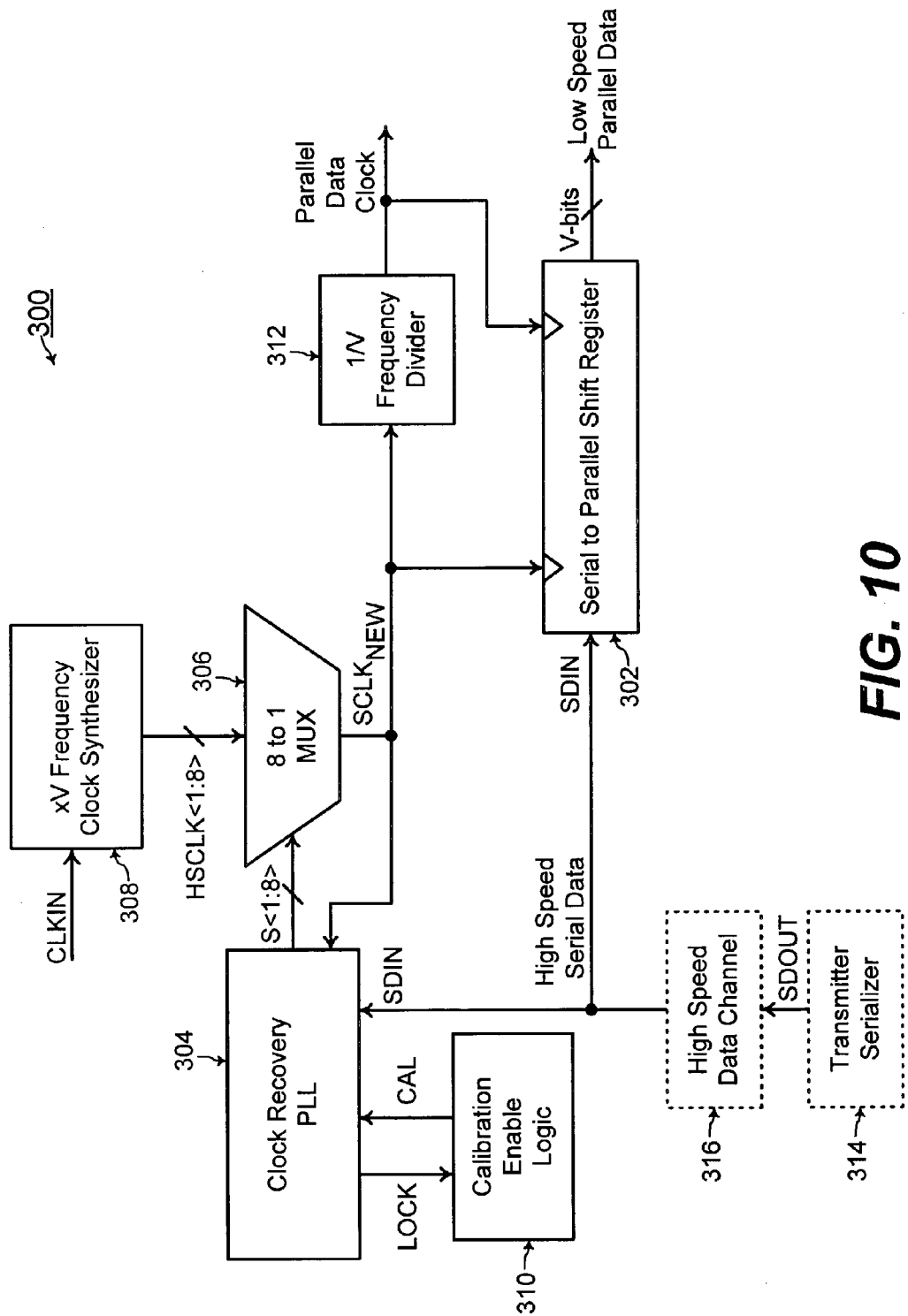
FIG. 10 shows a block diagram of a source synchronous receiver deserializer for automatic skew calibration, according to an embodiment of the present invention.

If the amount of the skew 246 is greater than such a predetermined percentage of the total bit time 186, then the source synchronous receiver deserializer 300 of FIG. 10 is used for automatic skew calibration according to another embodiment of the present invention. The receiver deserializer 300 includes a serial to parallel shift register 302 for sampling SDIN into parallel V-bits data. The receiver deserializer 300 also includes components for generating a sampling clock signal $SCLK_{NEW}$ and a parallel data clock signal from CLKIN. The receiver deserializer 300 also includes a calibration enable logic 310 and a 1/V frequency divider 312.

For generating $SCLK_{NEW}$, a clock recovery PLL (phase locked loop) 304 uses SDIN for generating multiplexer control signals S<1:8> sent to a multiplexer 306. A clock circuit, such as xV frequency clock synthesizer 308, inputs CLKIN and generates a plurality of high speed sampling clock signals HSCLK<1:8> (such as 222, 224, 226, 228, 230, 232, 234, and 236 of FIG. 8 for example).

The multiplexer 306 inputs the plurality of sampling clock signals HSCLK<1:8> and selects one of them as $SCLK_{NEW}$, depending on the control signals S<1:8> from the clock recovery PLL 304. The clock recovery PLL 304 compares the current phase of $SCLK_{NEW}$ and the phase of SDIN and adjusts the control signals S<1:8> until $SCLK_{NEW}$ and SDIN are "in-phase". Referring to FIG. 8 for example, $SCLK_{NEW}$ and SDIN are considered "in-phase" when a rising edge of $SCLK_{NEW}$ occurs at the center of the stable bit time period 240.

Figure 11:
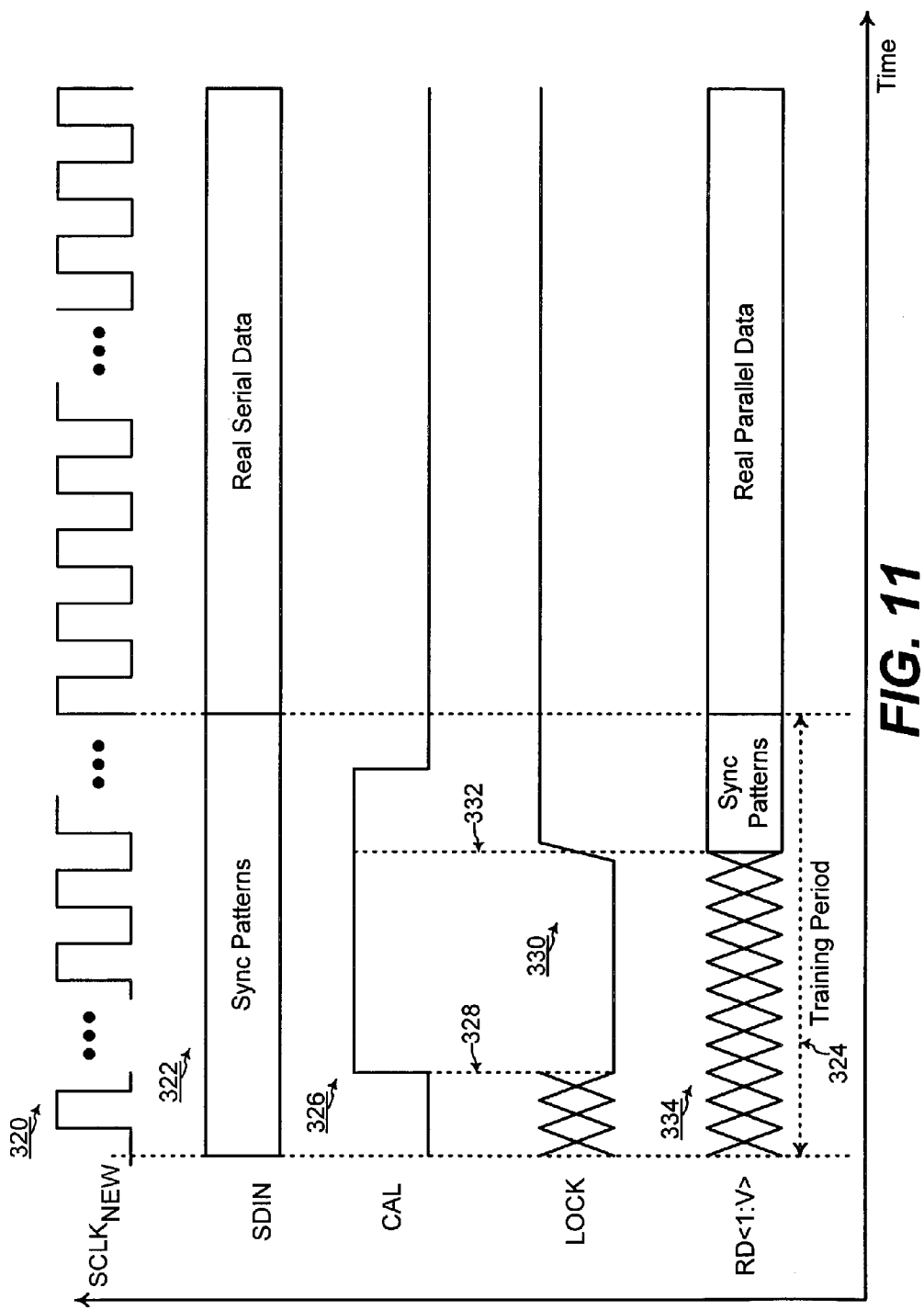
FIG. 11 shows a timing diagram during operation of the receiver deserializer of FIG. 10 with automatic skew calibration, according to an embodiment of the present invention.

FIG. 11 shows a timing diagram during operation of the source synchronous receiver deserializer 300 of FIG. 10. Referring to FIGS. 10 and 11, the clock recovery PLL 304 and the multiplexer 306 operate to generate $SCLK_{NEW}$ 320 that is "in-phase" with SDIN 322, during an initial training period 324. Referring to FIGS. 10 and 11, a transmitter serializer 314 generates SDOUT that is transmitted via a high speed data channel 316 to the source synchronous deserializer receiver 300. At power up, the transmitter serializer 314 generates sync patterns for SDOUT (and thus for SDIN). For example, the sync pattern is comprised of a repeating pattern of bytes, such as with each byte having a pattern of four low bits followed by four high bits (i.e., "00001111")

In addition, for invoking automatic skew calibration during the initial training period 320, the calibration enable logic 310 asserts a CAL control signal 326 at a first time point 328. When the clock recovery PLL receives the asserted CAL control signal 326, the clock recovery PLL 304 and the multiplexer 306 operate to adjust the phase of $SCLK_{NEW}$ 320 until $SCLK_{NEW}$ 320 is "in-phase" with SDIN 322. For example, when the rising edges of $SCLK_{NEW}$ 320 lead the centers of the stable bit time periods of SDIN, the clock recovery PLL adjusts the control signals S<1:8> such that the multiplexer 306 selects another one of the high speed sampling clock signals HSCLK<1:8> having a lower phase shift.

On the other hand, when the rising edges of $SCLK_{NEW}$ 320 lag the centers of the stable bit time periods of SDIN, the clock recovery PLL adjusts the control signals S<1:8> such that the multiplexer 306 selects another one of the high speed sampling clock signals HSCLK<1:8> having a higher phase shift. After such adjustments, when the rising edges of $SCLK_{NEW}$ substantially coincide with the centers of the stable bit time periods of SDIN, the clock recovery PLL locks into that $SCLK_{NEW}$ and asserts a LOCK control signal 330 at a second time point 332. The LOCK control signal 330 was initially de-asserted when the clock recovery PLL 304 was enabled with the asserted CAL control signal 326 at the first time point 328.

Referring to FIGS. 10 and 11, the 1/V frequency divider 312 divides the frequency of $SCLK_{NEW}$ to generate the parallel data clock signal having the lower frequency. In addition, the serial to parallel shift register 302 samples the SDIN 322 at every rising edge of $SCLK_{NEW}$ 320 and shifts out V-bits of parallel data RD<1:V>334 at every rising edge of the parallel data clock signal. After the LOCK control signal 330 is asserted at time point 332, the sync pattern begins to appear in the V-bits of parallel data RD<1:V>334 output by the serial to parallel shift register 302.

After the LOCK control signal 330 is asserted at time point 332, the calibration enable logic de-asserts the CAL control signal to disable the clock recovery PLL 304 from further adjusting the phase of $SCLK_{NEW}$. Once $SCLK_{NEW}$ is considered to be "in-phase" with SDIN, the phase of $SCLK_{NEW}$ is locked for subsequent operation of the source synchronous receiver deserializer 300. The length of the training period 324 when the transmitter serializer 314 transmits the sync pattern for SDIN is designed to sufficiently surround the time period when the CAL control signal 326 is asserted. After the training period 324, the transmitter serializer 314 transmits the real serial data to be processed by the receiving low speed data processor 104.

In this manner, automatic skew calibration is performed when the transmitter serializer 314 generates the sync pattern for SDIN during the training period 324 and when the CAL control signal 326 is asserted. With such automatic skew calibration, the clock recovery PLL 304 and the multiplexer 306 adjust the phase of $SCLK_{NEW}$ until the phase of $SCLK_{NEW}$ is substantially "in-phase" with SDIN. Implementation of each of the components 302, 304, 306, 308, 310, 312, 314, and 316 in FIG. 10, individually, is known to one of ordinary skill in the art of electronics.

Figure 12:
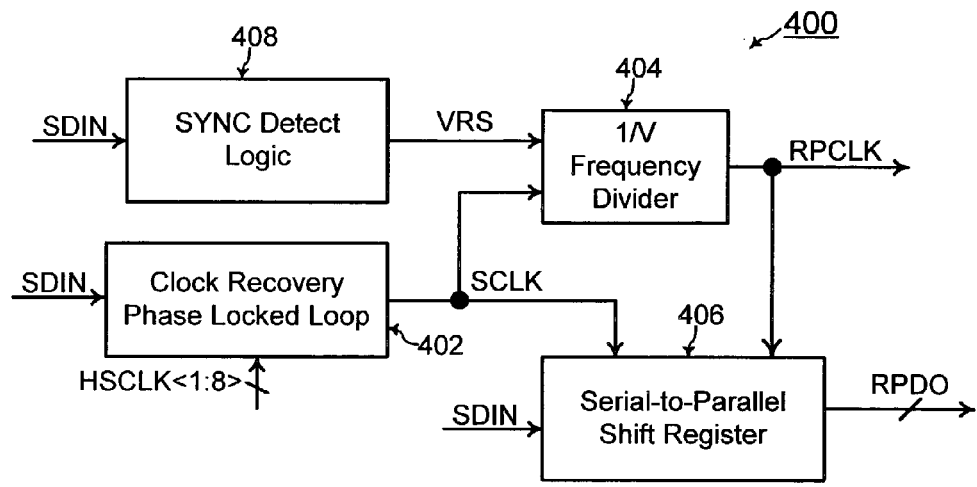
FIG. 12 shows a block diagram of a CDR (clock data recovery) receiver deserializer, as known in the prior art.

In an alternative embodiment of the present invention, components of a CDR (clock data recovery) receiver deserializer may be configured for performing the programmable skew cancellation of the components of FIG. 7 and the automatic skew calibration of the components of FIG. 10. FIG. 12 shows the prior art components of a CDR receiver deserializer 400 including a clock recovery PLL (phase locked loop) 402 that inputs SDIN for generating a recovered serial clock signal (SCLK) from SDIN. SCLK is input by a 1/V frequency divider 404 and a serial-to-parallel shift register 406. The serial-to-parallel shift register 406 samples SDIN at every rising edge of SCLK.

The 1/V frequency divider 404 generates a recovered parallel clock signal (RPCLK) having a cycle for every "V" cycles of SCLK. The recovered parallel clock signal (RPCLK) is input by the serial-to-parallel shift register 406 to generate a recovered parallel data output (RPDO) comprised of V-bits of SDIN at a rising edge of RPCLK. A SYNC detect logic 408 asserts a VRS (diVider ReSet) signal (i.e., a parallel clock enabling signal) for determining the timing of the rising edge of every cycle of RPCLK such that SDIN is properly partitioned to generate each of the V-bits of RPDO. The SYNC detect logic 408 inputs SDIN and asserts the VRS signal at the occurrence of a sync pattern within SDIN. Such a CDR receiver deserializer 400 and such operations and components 402, 404, 406, and 408 of the CDR receiver deserializer 400 are known to one of ordinary skill in the art of CDR SERDES (serializer/deserializer) transceivers.

Figure 13:
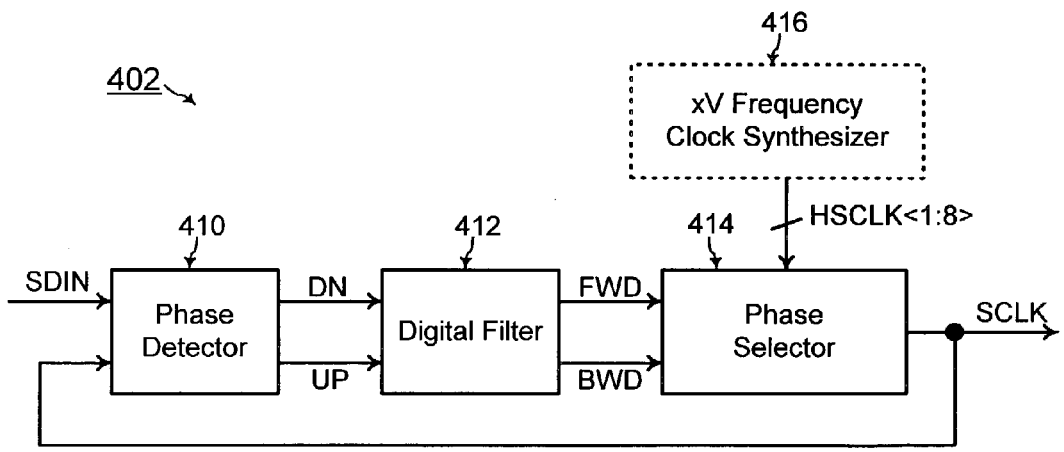
FIG. 13 shows a block diagram of a clock recovery phase locked loop of the CDR receiver of FIG. 12, as known in the prior art.

FIG. 13 shows the components of the clock recovery PLL 402 of FIG. 12 including a phase detector 410, a digital filter 412, and a phase selector 414 for generating SCLK from SDIN. The phase selector 410 inputs the high speed sampling clock signals HSCLK<1:8> from a xV frequency clock synthesizer 416 and selects one of them as the recovered serial clock signal (SCLK). The phase selector 414 selects one of the clock signals HSCLK<1:8> as SCLK depending on FWD and BWD control signals from the digital filter 412. The phase detector 410 compares the phases of SDIN and SCLK and generates the FWD and BWD, control signals to adjust the phase of SCLK until the phase of SCLK becomes substantially "in phase" with the phase of SDIN. Such a clock recovery PLL 402 and such operations and components 410, 412, and 414 of the clock recovery PLL 402 are known to one of ordinary skill in the art of CDR SERDES (serializer/deserializer) transceivers.

Figure 14:
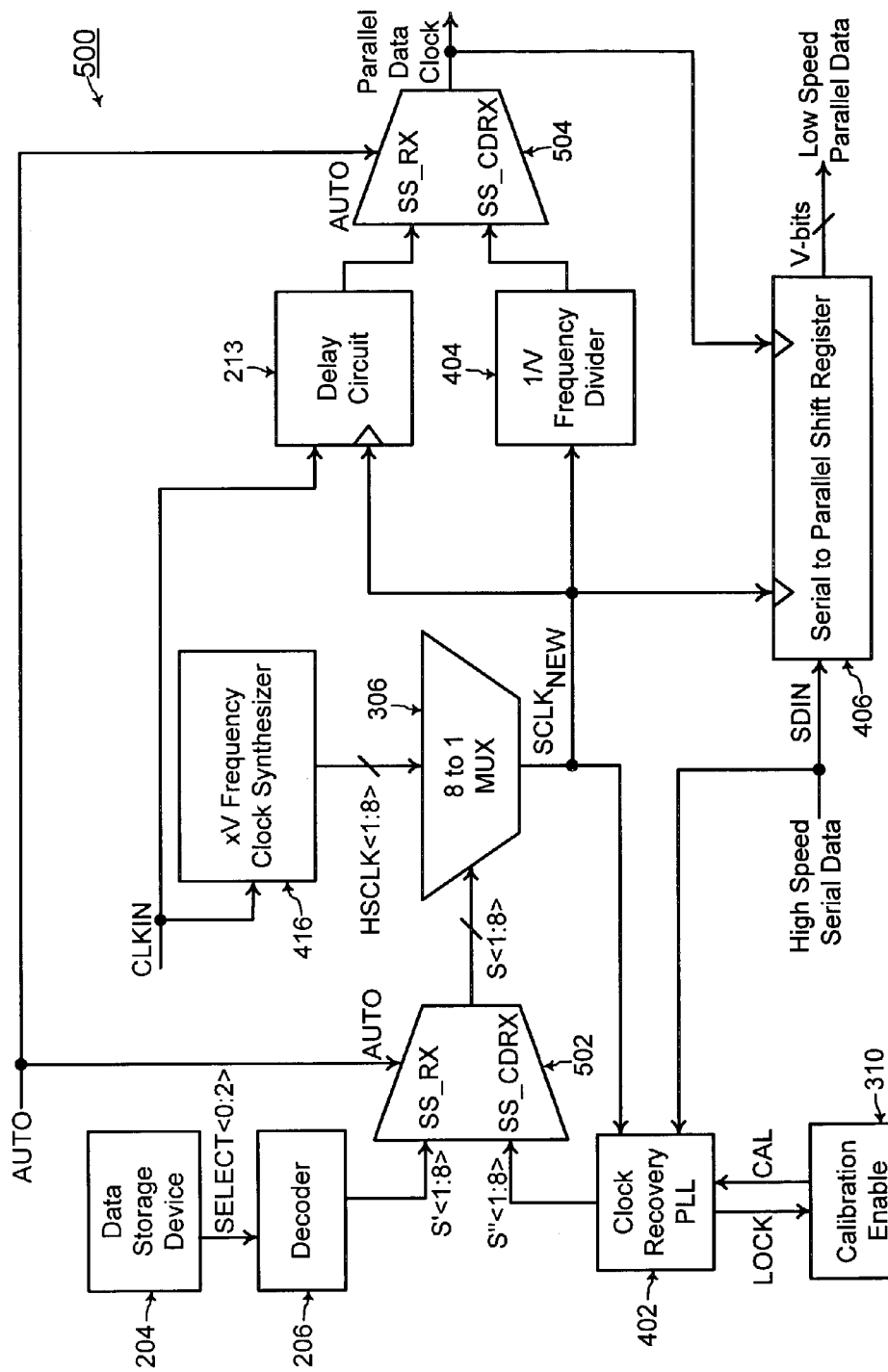
FIG. 14 shows a block diagram of a source synchronous receiver deserializer implemented with modification of the CDR receiver deserializer for providing both programmable skew cancellation and automatic skew calibration, according to an embodiment of the present invention.

Referring to FIGS. 12, 13, and 14, the components of the CDR receiver deserializer 400 of FIG. 12 are configured to form a source synchronous receiver deserializer 500 of FIG. 14 with programmable skew cancellation and automatic skew calibration, according to another embodiment of the present invention. Referring to FIGS. 7, 10, 12, and 14, elements having the same reference number refer to elements having similar structure and function. Comparing FIGS. 10, 12, and 14, the clock recovery PLL 304 of FIG. 10 is implemented with the clock recovery PLL 402 of FIG. 12. In addition, the multiplexer 306 of FIG. 14 may be part of the phase selector 414 that is also a part of the clock recovery PLL 402. Furthermore, a first mode multiplexer 502 and a second mode multiplexer 504 are added.

Figure 1:
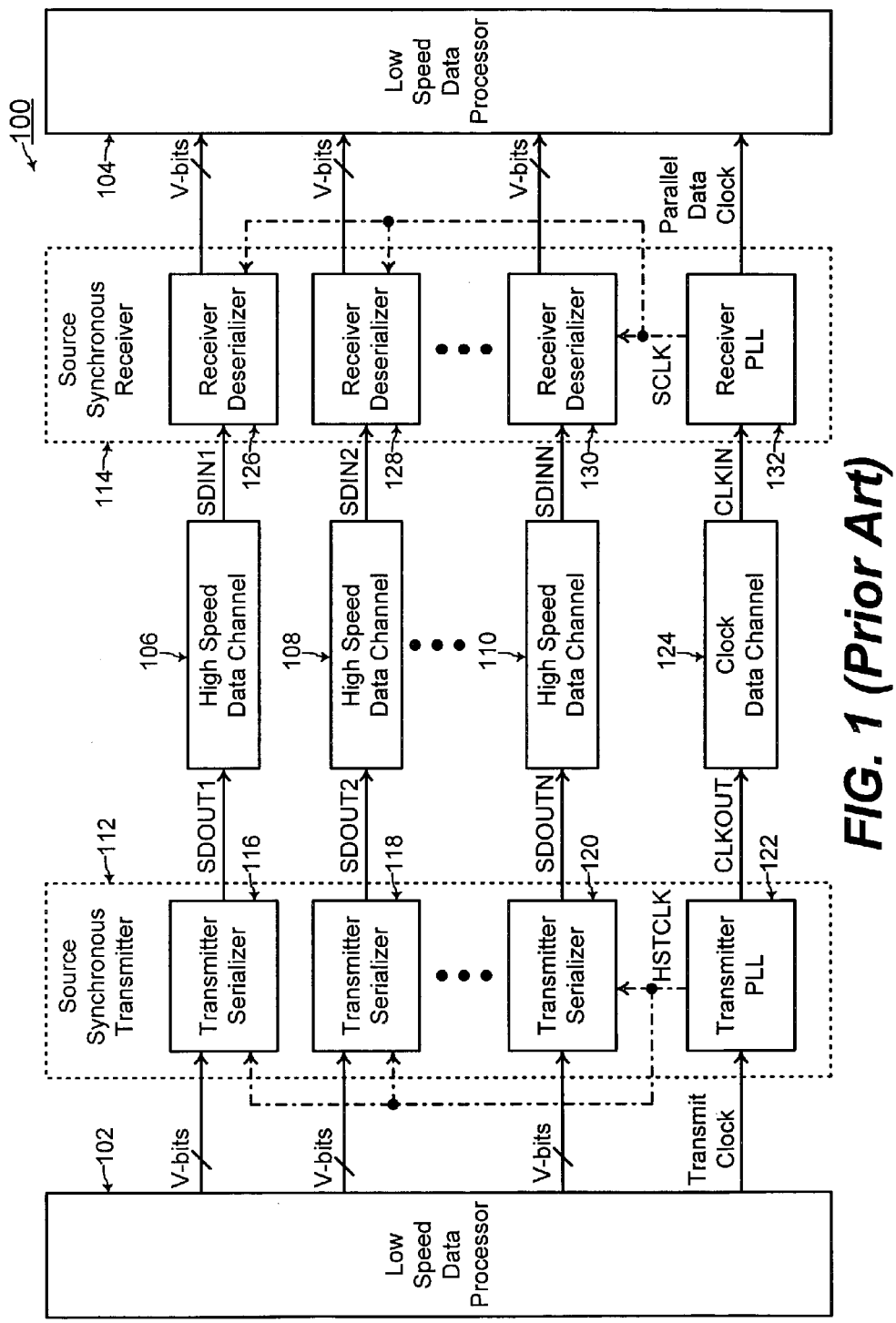
FIG. 1 shows a block diagram of a source synchronous communications system with multiple data channels, as known in the prior art.
Figure 2:
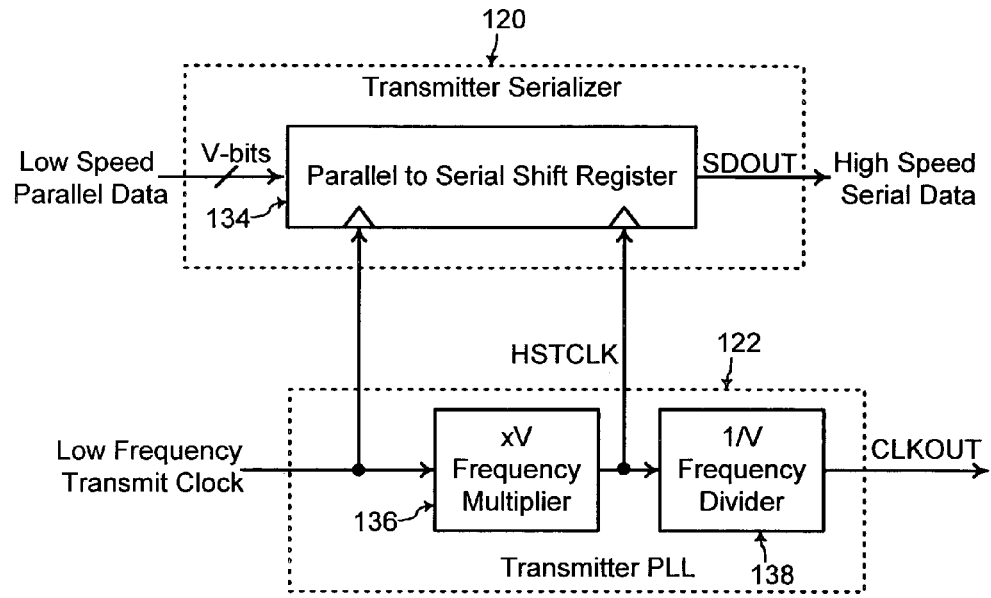
FIG. 2 shows a block diagram of a transmitter serializer and a transmitter phase locked loop of the source synchronous communications system of FIG. 1, according to the prior art.
Figure 15:
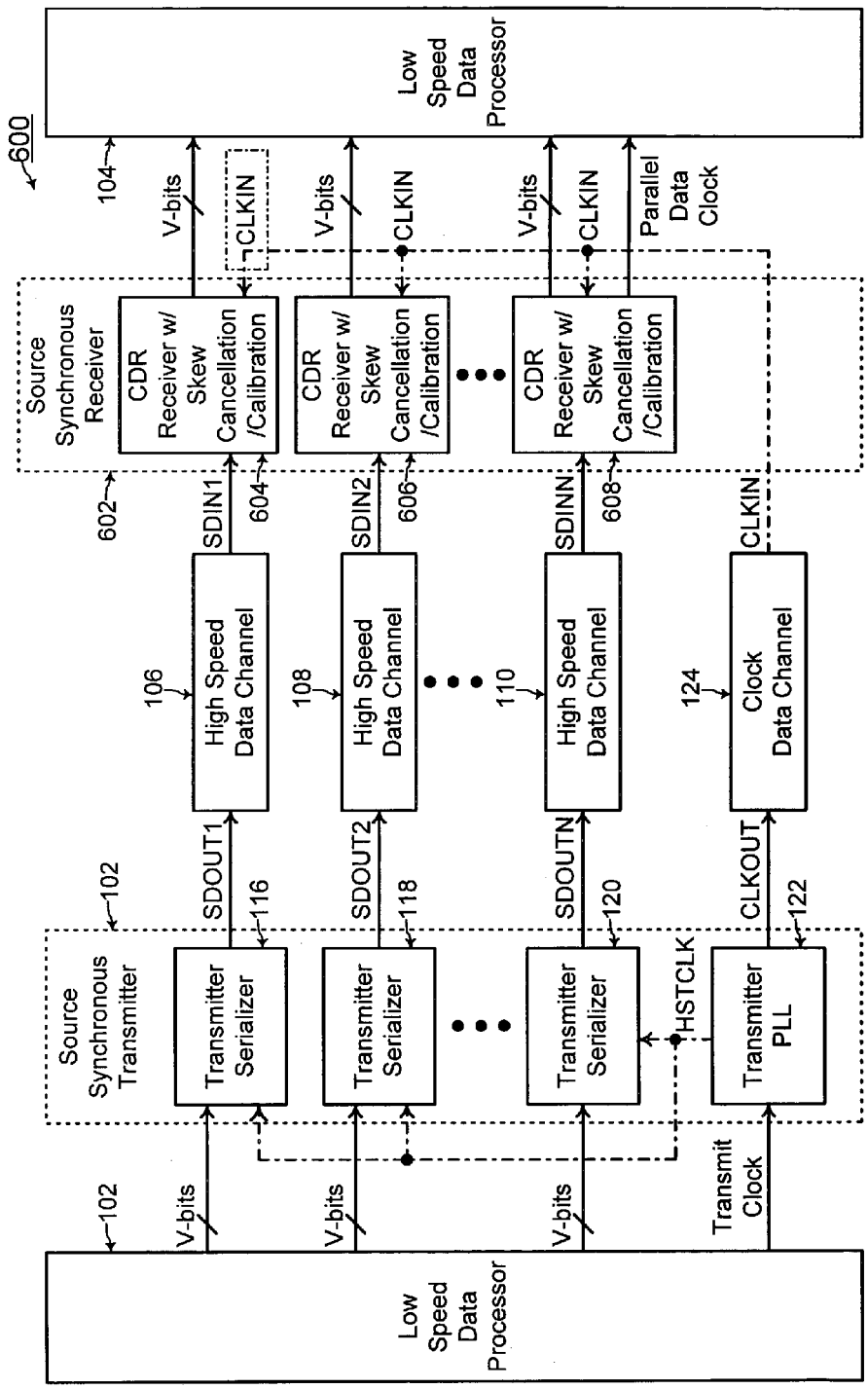
FIG. 15 illustrates a block diagram of a source synchronous communications system with the source synchronous receiver deserializer of FIG. 14 for each of the plurality of data channels, according to an embodiment of the present invention.

FIG. 15 shows a source synchronous communications system 600 of an embodiment of the present invention using the receiver deserializer 500 of FIG. 14. Referring to FIGS. 1 and 15, elements having the same reference number refer to elements having similar structure and function. Comparing FIGS. 1 and 15, the receiver PLL 132 of FIG. 1 is no longer used in the source synchronous receiver 602 of FIG. 6. In addition, each of the receiver deserializers 126, 128, and 130 of FIG. 1 are replaced with a corresponding receiver deserializer 604, 606, and 608, respectively, that are each substantially similar to the receiver deserializer 500 of FIG. 14.

Figure 16:
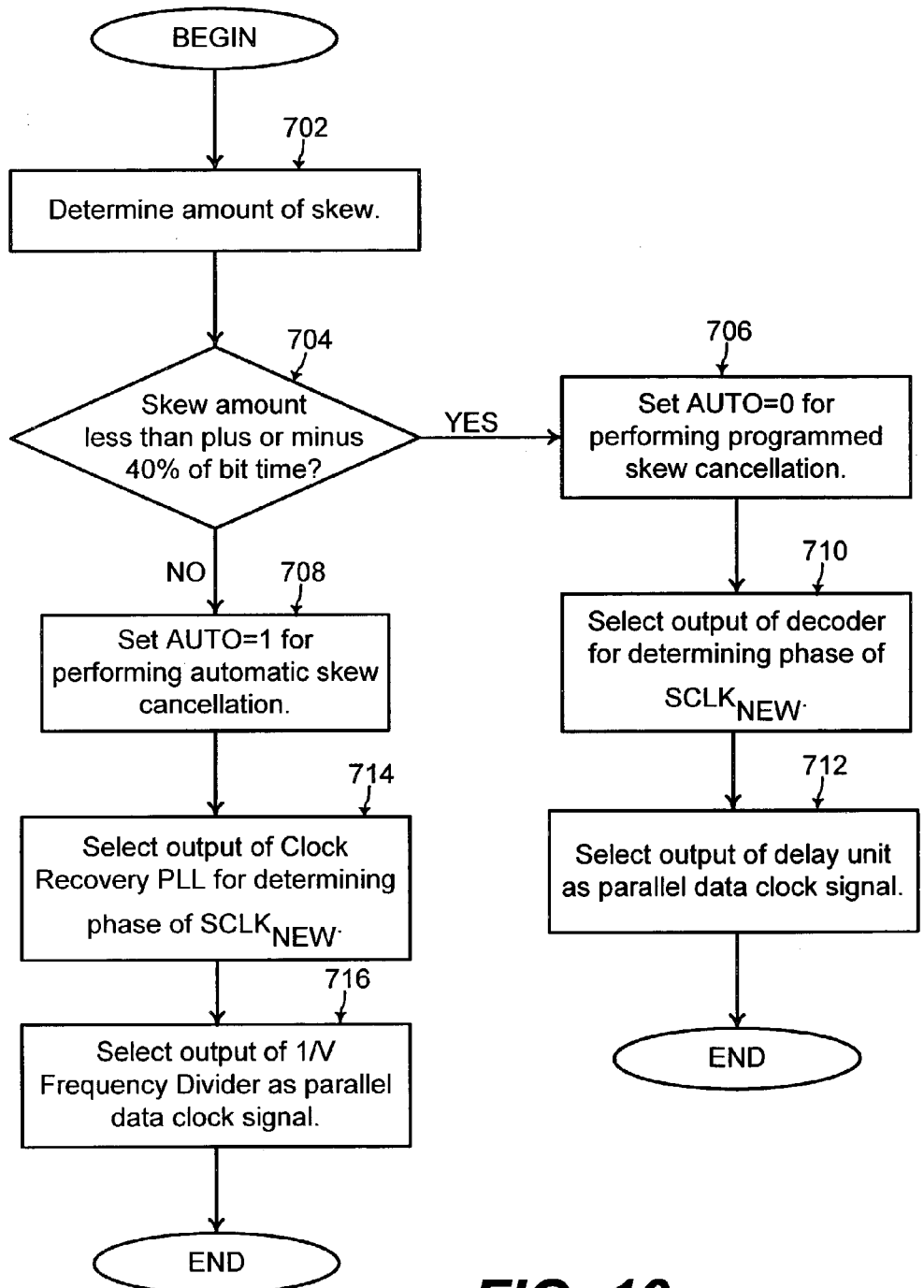
FIG. 16 shows a flow-chart of steps during operation of the receiver deserializer of FIG. 14, according to an embodiment of the present invention.

FIG. 16 shows a flow-chart of steps during operation of the receiver deserializer 500 of FIG. 14 as each of the receiver deserializers 604, 606, and 608 in FIG. 15. The receiver deserializer 500 inputs CLKIN from the clock data channel 124 and a respective SDIN from a respective one of the high speed data channels 106, 108, and 110. Referring to FIGS. 14 and 16, an amount of skew between such SDIN and CLKIN is determined (step 702 of FIG. 16).

Mechanisms for determining such an amount of skew is known to one of ordinary skill in the art of SERDES (serializer/deserializer) transceivers. For example, during calibration of a source synchronous communications system 600 of FIG. 15 using the receiver deserializer 200, the amount of skew 246 between CLKIN 252 and SDIN 238 is determined using signal measuring equipment such as an oscilloscope coupled at the inputs to a source synchronous receiver 602.

Then, a decision is made as to whether such an amount of skew is less than a predetermined percentage of the total bit time of SDIN (step 704 of FIG. 16). As already discussed in reference to FIG. 6, the predetermined percentage is determined as plus or minus (50% minus the X % of the total bit time for sample and hold during sampling a bit value of SDIN by the shift register 406).

Referring to FIGS. 14 and 16, if the amount of the skew between SDIN and CLKIN is less than the predetermined percentage of the total bit time, an AUTO control signal is de-asserted for performing programmed skew cancellation (step 706 of FIG. 16). On the other hand, if the amount of the skew is equal to or greater than the predetermined percentage of the total bit time, the AUTO control signal is asserted for performing automatic skew calibration (step 708 of FIG. 16).

Referring to FIG. 14, when the AUTO control signal is de-asserted for performing programmed skew cancellation, the first mode multiplexer 502 selects the control signals S'<1:8> from the decoder 206 for determining the phase of $SCLK_{NEW}$ from the multiplexer 306 (step 710 of FIG. 16). In addition, in that case, the second mode multiplexer 504 selects the output of the delay circuit 213 for generating the parallel data clock signal (step 712 of FIG. 16). Such a mode of operation for performing programmed skew cancellation is labeled as "SS_RX" (for regular source synchronous receiver) in the inputs of the multiplexers 502 and 504.

On the other hand, when the AUTO control signal is asserted for performing automatic skew calibration, the first mode multiplexer 502 selects the control signals S"<1:8> from the clock recovery PLL 402 for determining the phase of $SCLK_{NEW}$ from the multiplexer 306 (step 714 of FIG. 16). Furthermore, in that case, the second mode multiplexer 504 selects the output of the 1/V frequency divider 404 for generating the parallel data clock signal (step 716 of FIG. 16). Such a mode of operation for performing automatic skew calibration is labeled as "SS_CDRX" (for source synchronous CDR receiver) in the inputs of the multiplexers 502 and 504.

In this manner, components of a CDR receiver deserializer are configured to form the source synchronous receiver deserializer 500 of FIG. 14 with capability to provide programmable skew cancellation and automatic skew calibration. Referring to FIG. 15, each of the source synchronous receiver deserializers 604, 606, and 608 implemented similarly as the receiver deserializer 500 of FIG. 14 inputs CLKIN and provides separate skew cancellation or calibration depending on the respective amount of skew between the respective SDIN and the one CLKIN by generating a separate respective $SCLK_{NEW}$ for each of the high speed data channels 106, 108, and 110. Because each of the receiver deserializers 604, 606, and 608 accounts for such respective amount of skew, the skew tolerance through each of the plurality of data channels 106, 108, and 110 is loosened for easier design of such data channels.

In contrast referring to FIG. 1, all of the prior art receiver deserializers 126, 128, and 130 share the same sampling clock signal SCLK from the receiver PLL 132. Thus, the prior art source synchronous receiver 114 cannot eliminate the deleterious effects from variable amounts of skew between the respective SDIN and the one CLKIN for each of the multiple data channels 106, 108, and 110.

It will be understood by those of skill in the art that the foregoing description is only exemplary of the invention and is not intended to limit its application to the structure and operation described herein. For example, the present invention may be practiced with more numerous controls signals for finer adjustment of the phase of $SCLK_{NEW}$. In addition, the logical states described and illustrated herein are by way of example only, and the present invention may be practiced with other logical states as would be apparent to one of ordinary skill in the art of electronics from the description herein. Furthermore, many of the components illustrated and described herein for an example embodiment of the present invention may be alternatively implemented in hardware or software and in discrete or integrated circuits.

Additionally, the term "asserted" associated with a signal herein refers to changing the logical state of a signal from the logical low state to a logical high state, and the term "de-asserted" associated with a signal herein refers to changing the logical state of a signal from the logical high state to a logical low state. However, the term "asserted" and "de-asserted" associated with a signal may be inter-changed herein depending on the direction of change of the signal as such a direction of change of the signals may be reversed with use of inverters.

The present invention is limited only as defined in the following claims and equivalents thereof.

The invention claimed is:

1. A method of canceling skew between a received data signal and a received clock signal in the process of converting the received data signal from high speed serial data to low speed parallel data, the method comprising:
   multiplying the received clock signal to produce a high speed clock signal;
   generating a plurality of high speed sampling clock signals from the high speed clock signal;
   providing a skew value representing the amount of skew between the received data signal and the received clock signal;
   selecting one of the high speed sampling clock signals depending on the provided skew value;
   generating a parallel data clock signal from the selected high speed sampling clock signal; and
   with the selected high speed clock signal and the parallel data clock signal, converting the received data signal from high speed serial data to low speed parallel data.

2. The method of claim 1, wherein converting the received data signal from high speed serial data to low speed parallel data includes clocking a serial-to-parallel shift register with the selected high speed sampling clock signal and the parallel data clock signal.

3. The method of claim 1, wherein the received data signal contains symbols of V bits in length, and the frequency of the high speed clock signal is V times the frequency of the received clock signal.

4. The method of claim 1, wherein generating a plurality of high speed sampling clock signals from the high speed clock signal includes generating a plurality of high speed sampling clock signals that are successively phase shifted from each other by 45°.

5. The method of claim 1, wherein providing a skew value representing the amount of skew between the received data signal and received clock signal includes storing select bits indicating the amount of skew.

6. The method of claim 5, wherein selecting one of the high speed sampling clock signals depending on the provided skew value includes decoding the stored select bits.

7. The method of claim 1, wherein generating a parallel data clock signal includes dividing the frequency of the selected high speed sampling clock signal.

8. The method of claim 1, wherein generating a parallel data clock signal includes delaying the received clock signal using the selected high speed sampling clock signal.

9. The method of claim 1, wherein the parallel data clock signal is a first parallel data clock signal, the method including:
   generating a second parallel data clock signal from the received clock signal and the selected high speed sampling clock signal; and
   selecting between the first and second parallel data clock signals as the parallel data clock signal depending upon the amount of skew.

10. The method of claim 9, wherein generating a second parallel data clock signal from the received clock signal and the selected high speed sampling clock signal includes applying the received clock signal to a delay circuit and clocking the delay circuit with the selected high speed sampling clock signal to produce the second parallel data clock signal.

11. An integrated circuit comprising:
- a frequency multiplier operable to multiply a received clock signal to produce a high speed clock signal;
- a frequency synthesizer operable to generate a plurality of high speed sampling clock signals from the high speed clock signal;
- a data storage device operable to provide a skew value representing the amount of skew between a received data signal and the received clock signal;
- a multiplexer operable to select one of the high speed sampling clock signals from the frequency synthesizer depending on the skew value provided by the data storage device;
- a frequency divider operable to generate a parallel data clock signal from the selected high speed sampling clock signal; and
- a serial-to-parallel shift register responsive to the selected high speed clock signal and the parallel data clock signal and operable to convert the received data signal from high speed serial data to low speed parallel data.

12. The integrated circuit of claim 11, wherein the frequency multiplier and the frequency divider are operable at inverse rates.

13. An integrated circuit comprising:
- a frequency multiplier operable to multiply a received clock signal to produce a high speed clock signal;
- a frequency synthesizer operable to generate a plurality of high speed sampling clock signals from the high speed clock signal;
- a data storage device operable to provide a skew value representing the amount of skew between a received data signal and the received clock signal;
- a multiplexer operable to select one of the high speed sampling clock signals from the frequency synthesizer depending on the skew value provided by the data storage device;
- a delay circuit operable to generate a parallel data clock signal from the received clock signal and the selected high speed sampling clock signal; and
- a serial-to-parallel shift register responsive to the selected high speed clock signal and the parallel data clock signal and operable to convert the received data signal from high speed serial data to low speed parallel data.

14. The integrated circuit of claim 13, wherein the parallel data clock signal is a first parallel data clock signal, the integrated circuit including:
- a frequency divider operable to generate a second parallel data clock signal from the selected high speed sampling clock signal; and
- a multiplexer operable to select between the first and second parallel data clock signals depending upon the amount of skew.

15. An integrated circuit comprising:
- means for multiplying a received clock signal to produce a high speed clock signal;
- means for generating a plurality of high speed sampling clock signals from the high speed clock signal;
- means for providing a skew value representing the amount of skew between a received data signal and the received clock signal;
- means for selecting one of the high speed sampling clock signals depending on the provided skew value;
- means for generating a parallel data clock signal from the selected high speed sampling clock signal; and
- means responsive to the selected high speed clock signal and the parallel data clock signal for converting the received data signal from high speed serial data to low speed parallel data.

16. The integrated circuit of claim 15, wherein the means for generating a parallel data clock signal from the selected high speed sampling clock signal includes means for generating a parallel data clock signal from the selected high speed sampling clock signal and the received clock signal.

17. The integrated circuit of claim 16, including means responsive to the amount of skew for selecting between a first parallel data clock signal generated from the selected high speed sampling clock signal and a second parallel data clock signal generated from the selected high speed sampling clock signal and the received clock signal.

* * * * *